(No Model.)
L. ROETH.
SUPPORT FOR BICYCLES.
No. 467,709. Patented Jan. 26, 1892.
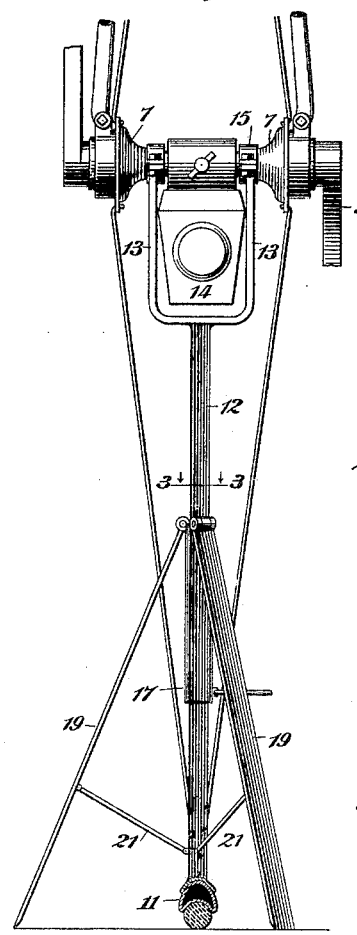
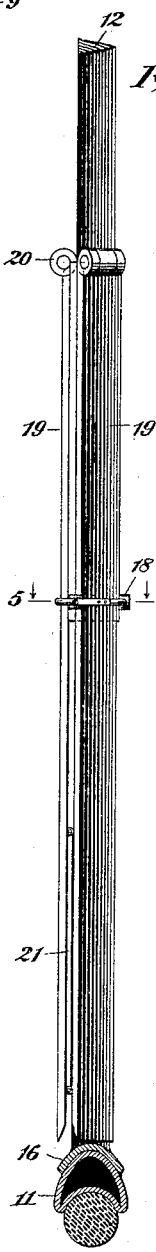
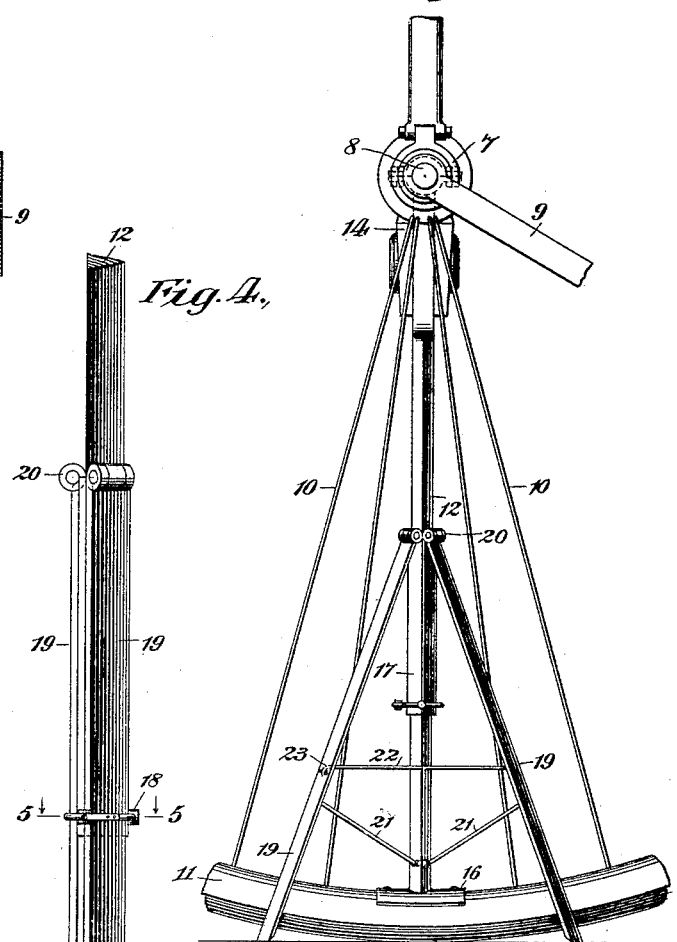
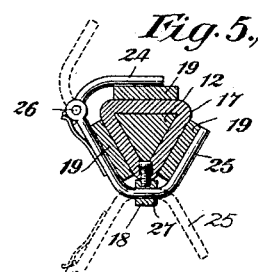
Witnesses
C. E. Ashley
I. W. Lloyd
Inventor
Louis Roeth
By his Attorneys
Fowler & Fowler

UNITED STATES PATENT OFFICE.

LOUIS ROETH, OF NEW YORK, N. Y.

SUPPORT FOR BICYCLES.

SPECIFICATION forming part of Letters Patent No. 467,709, dated January 26, 1892.

Application filed September 10, 1891. Serial No. 405,256. (No model.)

*To all whom it may concern:*

Be it known that I, LOUIS ROETH, a citizen of the United States, residing at New York, county and State of New York, have invented certain new and useful Improvements in Supports for Bicycles, of which the following is such a full, clear, and exact description as will enable any one skilled in the art to which it appertains to make and use the same, reference being had to the drawings forming part of this specification.

My invention relates to means for supporting a bicycle in upright position when it is not in use; and it consists in the certain novel and peculiar combinations and arrangements of the several parts of the device, all as fully hereinafter described, and then pointed out in the claims.

A type of my invention is illustrated in the accompanying drawings, in which—

Figure 1 shows in portion a bicycle-wheel having my improved support mounted thereon. In this view the upper portion of the wheel is broken away, while the lower portion thereof is shown in vertical cross-section. Fig. 2 is a side view of the parts shown in Fig. 1, in both of which views the support is unfolded and set in position of use. Fig. 3 is a view in section on a plane indicated by the line 3 3, Fig. 1. Fig. 4 is an enlarged view of the supporting device shown in folded position when not in use. Fig. 5 is an enlarged view in section on a plane indicated by line 5 5, Fig. 4.

Referring to the drawings, in which like numbers of reference indicate like parts throughout, 7 is the hub of an ordinary bicycle-wheel; 8, the axle; 9 9, the treadles; 10 10, the spokes; and 11 the rim. These parts may be of any well-known form and construction.

Between the hub or axle of the wheel and the rim 11 thereof I fix in radial position a suitable bar 12, which in the present construction is forked or bifurcated at its upper end at 13 in order to provide a convenient opening for the lamp 14 to swing in. The inner end of this bar 12, whether forked or not, may be secured to the axle or hub of the wheel in any preferred and suitable manner. In the present construction each arm 13 of the forked end of the bar is provided with a collar 15, which binds upon the axle 8, the outer end of the bar being made fast to the rim by means of a flange or plate 16. The bar 12 is made preferably triangular or square in cross-section, and upon it is loosely mounted a sleeve 17, which is adjustable along the length of the bar and has a set-screw 18 for holding it in adjustment on the bar. The interior of this sleeve is of the same shape in cross-section as the bar, and in the present construction it is accordingly triangular in shape, the set-screw being let into one of the angular edges of the sleeve, as is clearly indicated in Fig. 5.

The set of supporting rods or legs 19 are hinged by their upper ends 20 to a suitable point on the sleeve 17, and each rod is provided with a stay-bar 21, which is hinged to it and also to a fixed point on the wheel—for instance, to a point near the base of the bar 17, as is shown. Any preferred number of these supporting-rods may be used, though I have preferably shown three, one of which is arranged to swing out from one side of the wheel and the other two from the opposite side thereof, thus forming a three-legged support or tripod. The rods 19 here shown are flat and are hinged at the upper end of the sleeve, so that when the sleeve is slid in toward the center of the wheel on its bar these rods will fold up against the sleeve and bar, one lying flat against each face of the same, thus folding into a conveniently small compass. The sleeve 17 is limited in its movement on the bar toward the center of the wheel by means of the stay-bars 21, which also fold up between the bar and the inner face of the supporting-rods when the device is closed up, as shown in Fig. 4. The legs or supporting-rods 19 are readily unfolded and spread out to form a support by sliding the sleeve along the bar 17 out toward the rim of the wheel, the limit of such movement ordinarily being reached when the feet of all the rods touch the ground upon which the wheel stands, as is clearly indicated in the drawings.

Any suitable device or means may be employed for holding the supporting-rods in unfolded position when set for use, and many forms of such means will readily suggest themselves, though I have only shown one way in accomplishing this, this way consisting in providing the sleeve 17 with a set-screw 18, by means of which the sleeve may be held fast upon the bar 12, when the supporting-rods have been unfolded and spread out into position of use, thereby holding the latter rigidly in fixed position. This arrangement gives a very stable and solid support, for the reason that the several resting-points—three in the present instance—of the device are not in the same vertical planes. In the adjustment of the support shown the weight of the bicycle is upon the wheel, though the supporting-rods may obviously be spread out further, and in such a way as to raise the wheel clear of the ground upon which the supporting-rods rest.

To further insure a stable support and prevent the supporting-rods from rocking on their hinges, I provide a latch 22, which is hinged to one of the supporting-rods and engages and locks with another of the same at 23. This latch will serve to hold the rods steady, and thereby give a firmer support.

In order to secure the supporting-rods in folded position, any form of lock or clasp may be used, though I show a simple well-known form conveniently combined with the set-screw 18 of the sleeve. The clasp shown is of a well-known form, consisting in two arms 24 25, hinged together at 26 and provided with a snap or spring joint, by virtue of which the arm 24 may be snapped into either the full or dotted-in line position, as shown in Fig. 5. The arm 25 is U shape, with the central portion thereof loosely passing through an eye 27, formed in the head of the set-screw 18. This arm engages two of the supporting-rods, while the arm 24 engages one of the same, and thus they serve to lock the rods firmly against the sleeve when they are folded up, as shown in Figs. 4 and 5. To release the rods 19, the arm 24 of the clasp is first snapped into the dotted-line position shown in Fig. 5, and both arms 24 and 25 are then swung over into the position shown in dotted lines.

While I have preferably shown three legs or supporting-rods 19, the invention is not limited to any particular number of the same. I further desire it to be understood that I do not limit myself to the specific construction of the device herein shown, since the invention is obviously of such scope as to admit of various modifications being made in the construction thereof.

From the foregoing description of my invention it will be seen that the support can be readily released, unfolded, and set in position for use, so as to firmly support the machine in upright or vertical position. The support can be readily attached to any form of bicycle and possesses the advantage of being capable of being folded up into a very small space in a convenient place on the machine, where it is out of the way, and at the same time it is so constructed that it will not work loose or rattle while the machine is in motion.

Having thus described my improvements in supports for bicycles, what I claim as my invention, and desire to secure by Letters Patent, is—

1. A support for a bicycle, consisting in the combination, with a wheel having a radial bar fixed thereto, of one or more hinged supporting-rods mounted upon said bar and folding thereon and means for holding the supporting rod or rods in fixed position when unfolded and set to support the bicycle.

2. A bicycle-support consisting in the combination, with a wheel having a radial bar fixed thereto, of one or more hinged supporting-rods mounted upon said bar at their hinged ends and adjustable lengthwise the bar, each supporting-rod provided with a stay-bar hinged between it and a fixed point on the wheel, and means for locking or holding the supporting rod or rods in fixed position when unfolded and set to support the bicycle.

3. A bicycle-support consisting in the combination, with a wheel having a bar fixed radially thereto, of a sleeve adjustably mounted upon said bar and provided with a lock for holding it in adjustment, and one or more supporting-rods hinged by their upper ends to said sleeve and adapted to fold against said bar and provided with means for limiting their outward range of movement on their hinges, whereby the vertical adjustment of the sleeve upon the bar effects the unfolding and setting of the supporting-rods, for the purpose set forth.

4. A bicycle-support consisting in the combination, with a wheel having a bar fixed radially thereto, of a sleeve sliding upon said bar and provided with a set-screw to hold it in adjustment on the bar, and a set of supporting-rods hinged by their upper ends to the said sleeve and adapted to fold against the bar, each of said supporting-rods provided with a stay-bar hinged by one end to the rod and by the other to the radial bar, whereby the supporting-rods may be folded and unfolded by adjusting the sleeve on the radial bar.

5. A bicycle-support consisting in the combination, with a wheel having a bar fixed radially thereto, of a sleeve sliding lengthwise upon said bar and provided with a set-screw or device for holding it in adjustment upon the bar, a set of supporting-rods hinged by their upper ends to said sleeve and adapted to fold against the bar, each of said rods provided with a stay-bar hinged between it and said radial bar, and a latch-bar mounted between two of said supporting-rods for locking them in unfolded position when set for use.

6. In a bicycle-support, the combination, with a sliding adjustable sleeve having a set of supporting-rods hinged thereto and folding thereagainst, of a clasp mounted upon the sleeve and adapted to engage and hold the supporting-rods in folded position.

7. In a bicycle-support, the combination, with a sliding adjustable sleeve provided with a set-screw for holding it in adjustment, of a set of supporting-rods hinged to the sleeve and a clasp mounted upon the set-screw and adapted to engage and hold the supporting-rods in folding position.

8. A bicycle-support consisting in the combination, with a wheel having a fixed radial bar 12, of a set of hinged supporting rods or legs 19 19, mounted upon said bar and adapted to fold upon the same, and means for holding the rods when unfolded and set in position for use, substantially as and for the purpose described.

9. A bicycle-support consisting in the combination, with a wheel having a radial bar 12 fixed thereto, of a sliding sleeve 17, mounted upon said bar and provided with a set-screw or device for holding it in adjustment on the bar, and a set of supporting-rods 19 19, hinged at 20 to the sleeve and each provided with a stay-bar 21, hinged intermediate the same and a fixed point on the wheel—for instance, the base of the said bar 12—substantially as and for the purpose described.

10. In a bicycle-support, the combination, with a sliding sleeve 17, provided with a set-screw or device for holding it in adjustment on the bar, of a set of supporting-rods 19 19, hinged by their ends to the sleeve and adapted to fold against the same, and a clasp mounted upon the sleeve for holding the rods in folded position, substantially as and for the purpose described.

In testimony whereof I have hereunto set my hand and my seal, this 5th day of September, 1891, in the presence of the two subscribing witnesses.

LOUIS ROETH. [L. S.]

Witnesses:
WILLIS FOWLER,
ROBT. C. TAYLOR.